Patented Nov. 29, 1938

2,138,146

UNITED STATES PATENT OFFICE 2,138,146

ESTERS OF CELLULOSE AND THEIR PREPARATION

Camille Dreyfus, New York, N. Y., and William Whitehead, Cumberland, Md., assignors to Celanese Corporation of America, a corporation of Delaware No Drawing. Application June 5, 1936, Serial No. 83,700

3 Claims. (Cl. 260—102)

This invention relates to the manufacture and preparation of esters of cellulose, and removal of undesirable bodies from the esters of cellulose and solutions or articles comprising the esters of cellulose. This invention particularly relates to cellulose acetate solutions to be used in the formation of films, filaments, yarns, plastics, etc.

An object of this invention is to greatly increase the effective separation and removal of corrosive, haze-forming and unstable bodies by means of filtration. Another object of this invention is to render solutions of cellulose acetate more amenable to the operations of spinning filaments, films and the like from same and to improve economy in such processing. A still further object of the invention is to form from cellulose acetate containing undesirable bodies a cellulose acetate substantially free of such bodies. Other objects of the invention will appear from the following detailed description of the invention.

Long and careful analysis of the bodies removed by filtration from solutions of cellulose esters and the behavior of these bodies while in solution and in filaments, yarns and like products derived therefrom has revealed that minute traces of these bodies are very difficult to remove by filtration, and, even when filtered through filters of extremely fine pore size, such bodies are not readily removed. For instance, these bodies may be present in substantially less than 1% based on the total weight of the ester of cellulose present. Although the ester of cellulose is colloidally dispersed or peptized in a solvent which, for example, may be acetone or its mixtures with waters and/or alcohol, these bodies, in normal procedure, are not removed from the solution even when the solution is filtered through several inches of compacted cellulose fiber. One difficulty with such bodies is that they, after passing through the filter, coalesce or agglomerate into particles of large size necessitating another filtration immediately prior to the use of the solution in order to avoid clogging when the solutions are extruded in the spinning operation through fine orifices, slits and the like, and to avoid cloudiness and haze in the formed films, transparent molded articles and the like.

We have further found that many of these bodies, when sulphuric acid and like catalysts are employed in esterification, are relatively rich in combined sulphur and that such bodies effect a material disadvantage in solutions, gels, plastic forms, etc. of the cellulose ester, since these bodies, although usually only present in traces, are active in destabilizing the cellulose ester with respect to its viscosity and general properties. This is exemplified by the fact that solutions of the cellulose acetate which contain such bodies having combined sulphur, say, to such extent as 0.06% based on the weight of the cellulose acetate present, expressing this figure in terms of $SO_4$, greatly lowers the viscosity on standing no matter whether the viscosity be measured in the same solution or after precipitation and redissolving of the ester in a second solution; while an acetate containing one-half of such total $SO_4$, for example, shows only minute changes in viscosity on standing. Where the ester of cellulose contains more than .03% of combined $SO_4$, this change in viscosity is speeded up considerably by warming the solution above normal temperature, say to 45° to 50° C. This factor is of considerable importance in processes involving the dry or evaporative method of spinning the esters of cellulose in that the spinning solution is subjected to elevated temperatures in the spinning header and/or the spinning cabinet.

We have also found that where solutions containing labile sulphur are used in dry spinning operations employing heat in the spinning header and/or the spinning cabinet, the treating of the solution with elevated temperatures influences the physical properties of the yarn. For example, the heating of such a solution results in yarn which will deluster more readily when subjected to the action of boiling soap solutions. Furthermore, the yarn formed from such heated solutions when subjected to the delustering treatment, after ageing, delusters more readily but unevenly. By preparing organic esters of cellulose in accordance with this invention, heat may be applied to solutions of the same without effecting a substantial change in the delustering properties of the articles formed from the solution. The ester of cellulose prepared in accordance with this invention is considerably more stable than those heretofore produced, especially in regard to delustering after having aged from three to twelve months or more.

A further disadvantage of the presence of the filterable bodies, which cause corrosion, form agglomerates in solutions and produce haze in the formed articles, is that they react with the metals and thin deposits of metallic salts which are present in the mechanical systems of mixing, transferring, filtration and spinning. Reaction products of the metals and these bodies are frequently of undesirable color, imparting an off shade to yarn and like products. Furthermore, when reacted with metal, these bodies coalesce more readily and otherwise separate so that even after several stages of filtration, some of the bodies remaining react with the metals, separate, and result in interruptions in spinning and like processes by clogging the jet holes, changing the viscosity, etc.

In accordance with our invention, we prepare esters of cellulose containing labile sulphur bodies and other bodies which tend to coalesce and/or be corrosive and then cause these bodies to coalesce or react to produce compounds or agglomerates of such nature that they are filterable from the solution. In accordance with this invention, these undesirable bodies may be eliminated by filtration and thus their undesirable effect is reduced very substantially by processes involving warming or heating solutions of the esters of cellulose prior to filtering and more particularly by passing heated solutions of the esters of cellulose over large surfaces of metals between or prior to filtration.

Any increase in temperature above the normal room atmospheric temperature is effective but it is preferable to carry the temperature to as high a point as is consistent with facility of operation. Thus, when employing such solvents as acetone, temperatures below its boiling point such as, for example, 50° C. are very effective. By such treatment much larger quantities of these bodies are filtered out and the limpidifying action of temperature on the solution greatly increases the flow rate during filtration and permits of considerably larger quantities of material to be filtered before the filtration device becomes choked up to such a low flow rate that it is no longer economical to continue with the filter dressing material without changes. By employing this invention esters of cellulose may be prepared which have less than 0.03% of sulphur compounds, calculated as SO4. For instance, cellulose esters may be prepared using sulphuric acid catalysts and/or sulphur bodies in the acid anhydride which have from 0.03% to as low as 0.0008% of sulphur bodies.

The limpidifying action produced by heating the solutions of the esters of cellulose results in considerable economies in filtration. The economies are evident in the matter of capital outlay for filtration equipment, building costs and the like, and, further, in the substantial decreased amount of spinning solution which must be standing between the various stages of operation, in that less equipment is involved in filtering or purifying the given daily output of material. By the process of our invention, the undesirable bodies are coalesced or formed into compounds or agglomerates to a filterable size and separated by filtration, and, as these bodies are reduced to such a negligible amount, there is no further appreciable reaction of these bodies and therefore further filtration immediately prior to use of the solution is rendered unnecessary. This greatly reduces the cost that was involved in processes prior to this invention.

To improve the separation of these undesirable bodies in accordance with this invention, the solution may be led in contact, preferably at elevated temperature, with metals such as copper, zinc, iron, and the like. Many methods may be employed of exposing a large surface of the metal to the solution. For instance, there may be employed fine metallic films, plates, granules, sheets of corrugated metal or powders of filterable size.

The treatment with metals may be effected by passing the solution of the ester of cellulose through a column containing the metals in a form presenting a large surface area. The metal may be present in the column in the form of plates, powder, beads, rings, shavings, curls, turnings, etc. A very efficient column is produced by the use of metal wool. Although any suitable metal may be employed alone or in series, we prefer to form with two or more metals a voltaic couple or cell, zinc being preferably one of the metals.

Methods of preheating or heating the solution before or during filtration may take a variety of forms and it is not intended that the scope of this invention should be limited to any specific method of heating the solutions. By way of example, the solution of cellulose esters may be led through small pipes which in turn are situated in a heating chamber through which circulates steam, steam and air and/or hot water or other heating medium. Similarly, heated air alone may be employed and an economy effected by employing the exhaust from the spinning cabinet of the dry or evaporative spinning operation employed in the spinning of yarns. For instance, the exhaust from such a cabinet may be led from said cabinet through the heat transfer chamber employed for warming the spinning solution prior to or during filtration.

To avoid any undesirably cooling effect, the filter presses or other filtering devices are preferably jacketed with heat insulating material. For instance, the presses may be covered to any desirable thickness with asbestos fiber or other insulating material which may be formed to fit the press and may be formed in two or more sections for ready removal and replacement to aid in the inspection and dressing of the press. The press or other filtering device may also be maintained at a suitable temperature by proximity to heating elements or it may be heated by contact with heating devices which may employ steam, hot water, hot liquids, electricity or other means of transferring heat.

A further advantage of this invention is that esters of cellulose are apt to contain traces of very labile sulphur. The origin of this labile sulphur may be traced to many sources such as the sulphides in the metals with which the ester comes in contact, contamination from water employed in washing the acetate and other processes, sulphur compounds originating in the acetic anhydride or other anhydride employed in esterification and in the use of sulphuric acid or sulphur-containing compounds used as catalysts. Such labile sulphur is undesirable in that it reacts with metals of the apparatus producing corrosion, frequently flaking off the side of the apparatus, thus disturbing the processes by producing undesirable effects in the products manufactured.

By employing this invention, such labile sulphur bodies are substantially removed (i. e. to below 0.03%) by heating the solution containing such bodies to elevated temperature and then passing the solution while at elevated temperature in contact with suitable metals. At the elevated temperatures employed by this invention, these bodies react very readily and are either trapped on the metal, or trapped in the filtration which follows, in the form of metallic sulphides and other compounds.

Where the ester of cellulose contains a relatively large amount of combined SO4 (say 0.1 to 0.03%), it is sometimes advisable to treat at room temperature the said cellulose ester solution with metals and filters, then elevate the temperature of the solution and again treat the said solution with metals and filter. If the percentage of combined $SO_4$ in the cellulose ester is high, a heating operation prior to first filtering the solution may result in a lowering of the viscosity of the cellulose ester solution. However, some of the bodies containing $SO_4$ may be removed by a cold filtration to reduce the total $SO_4$ content to an amount low enough that they do not detrimentally affect the cellulose ester during the short time it is maintained at an elevated temperature in the final treatment.

For the purposes of this invention, any suitable concentration of the solution may be employed. For instance, the solution may be made containing from 40% to less than 10% of the cellulose ester in a suitable solvent. Furthermore, any suitable solvent, such as acetone, acetone and water, acetone and ethyl or methyl alcohol, ethylene dichloride with or without ethyl or methyl alcohol, etc., may be employed.

Although this invention has been described with particular reference to cellulose acetate, it is also applicable to the other esters of cellulose, such as cellulose nitrate, cellulose formate, cellulose butyrate and cellulose propionate.

A solution of the ester of cellulose may be filtered through any convenient type of the many filter presses or continuous rotating filters. As filtering mediums, fine cloth, paper, wood pulp, or other cellulosic materials may be used in single or multiple layers. A number of filtrations may be made through the same type of medium or through different types of mediums if desired. For instance, two or six or more filtrations may be made through the same or different mediums. To the solution may be added filter aids such as carbon black, silica gel, fuller's earth or other types of granular or fibrous materials which will aid filtration or absorb color from solutions. As stated above, the removal of the undesirable bodies may be aided by treating the solution before or during filtration with metals. For example, metal powders of filterable size may be added to the solution prior to filtration or the solution may be passed through a column containing the metals either before filtration or between filtrations.

The ester of cellulose prepared in accordance with our invention may be formed into films and plastics containing plasticizers, in which case it may be desirable to have the plasticizer present during the filtration. The ester of cellulose may be dissolved in a volatile solvent therefor and may have incorporated therein plasticizers such as triacetin, diacetin, dibutyl tartrate, diethyl phthalate, triphenyl phosphate or other suitable plasticizers. Any suitable amount of plasticizer may be incorporated in the solution depending upon the use for which the solution is intended. For instance, in making plastics, films, tubes and the like, from 50 to 100 or more parts of plasticizer may be employed. Solutions containing the ester of cellulose and plasticizer may be formed into sheets, blocks, tubes, rods or other articles by any suitable process. Another important application of this invention is in the making of molding powders containing a purified ester of cellulose in finely divided condition together with plasticizers and a little or substantially no volatile solvents. These molding powders may be molded under heat and pressure to the desired shape. Films to be employed as a base for photographic or cinematographic films or other purposes may also be made from this material. The purified ester of cellulose may also be used for making lacquers, particularly clear or light-colored lacquers.

Although the ester of cellulose prepared in accordance with this invention may be used for any purposes in which esters of cellulose are normally employed, it is of particular value for the formation of fine denier filaments by the dry method of spinning yarns. The ester of cellulose when formed into such filaments by the dry method of spinning is more stable in ultra-violet light, is not off color and is of uniform delusterability.

In order to further illustrate this invention but without being limited thereby, the following examples are given:

*Example I*

Cellulose acetate of any suitable acetyl value (for instance, from 52 to 57 acetyl value calculated on acetic acid) and an acetone viscosity of from 18 to 25 is dissolved in three times its weight of acetone. The cellulose acetate contains 0.04% by weight of sulphur containing bodies (calculated as combined $SO_4$). This solution is heated to between 45° C. and 50° C. and filtered through a mixture of steel or zinc and copper wool and then through cellulose fiber. The resulting cellulose acetate is found to have a combined $SO_4$ content of less than .002%.

*Example II*

Cellulose acetate as above, except that it has a combined $SO_4$ content of 0.9, is dissolved in three times its weight of 95/5 acetone/water solvent and filtered at room temperature through cellulose fiber then elevated to a temperature of from 45° C. to 50° C. and filtered through a mixture of steel or zinc and copper wool and then through cellulose fiber, while being maintained at the elevated temperature. The resulting cellulose acetate is found to have a combined $SO_4$ content of below .004%.

It is to be understood that the foregoing detailed description is given merely by way of illustration and that many variations may be made therein without departing from the spirit of our invention.

The term "attenuated" as employed hereinafter in the claims is to be construed as meaning in the form of powder, granules, or other finely divided form, or of strips, wire, metal wool, thin plates, films, shavings, turnings, or the like.

Having described our invention, what we desire to secure by Letters Patent is:

1. Process for removing sulphur impurities from cellulose esters, selected from the group consisting of cellulose nitrate, cellulose formate, cellulose acetate, cellulose butyrate and cellulose propionate, containing such impurities, which comprises dissolving the cellulose ester in a solvent therefor, heating the solution of the cellulose ester to a temperature of between 45° C. and 50° C., passing the hot solution of the cellulose ester through a column containing a mixture of metal wools, selected from the group consisting of steel wool, zinc wool and copper wool, in an amount sufficient to reduce the combined $SO_4$ content below .03%, and filtering the hot solution.

2. Process for removing sulphur impurities from cellulose esters, selected from the group consisting of cellulose nitrate, cellulose formate, cellulose acetate, cellulose butyrate and cellulose propionate, containing such impurities, which comprises dissolving the cellulose ester in a solvent therefor, filtering the solution in the cold, heating the solution of the cellulose ester to a temperature of between 45° C. and 50° C., passing the hot solution of the cellulose ester through a column containing a mixture of metal wools, selected from the group consisting of steel wool, zinc wool and copper wool, in an amount sufficient to reduce the combined $SO_4$ content below .03%, and filtering the hot solution.

3. Process for removing sulphur impurities from cellulose acetate containing such impurities, which comprises dissolving the cellulose acetate in a solvent therefor, heating the solution of the cellulose acetate to a temperature of between 45° C. and 50° C., passing the hot solution of the cellulose acetate through a column containing a mixture of metal wools, selected from the group consisting of steel wool, zinc wool and copper wool, in an amount sufficient to reduce the combined $SO_4$ content below .03%, and filtering the hot solution.

WILLIAM WHITEHEAD.
CAMILLE DREYFUS.